Jan. 23, 1951     J. W. THOMPSON     2,539,286
ROAD MAP ASSEMBLY FOR AUTOMOBILE SUNSHADES
Filed Nov. 17, 1947     2 Sheets-Sheet 1
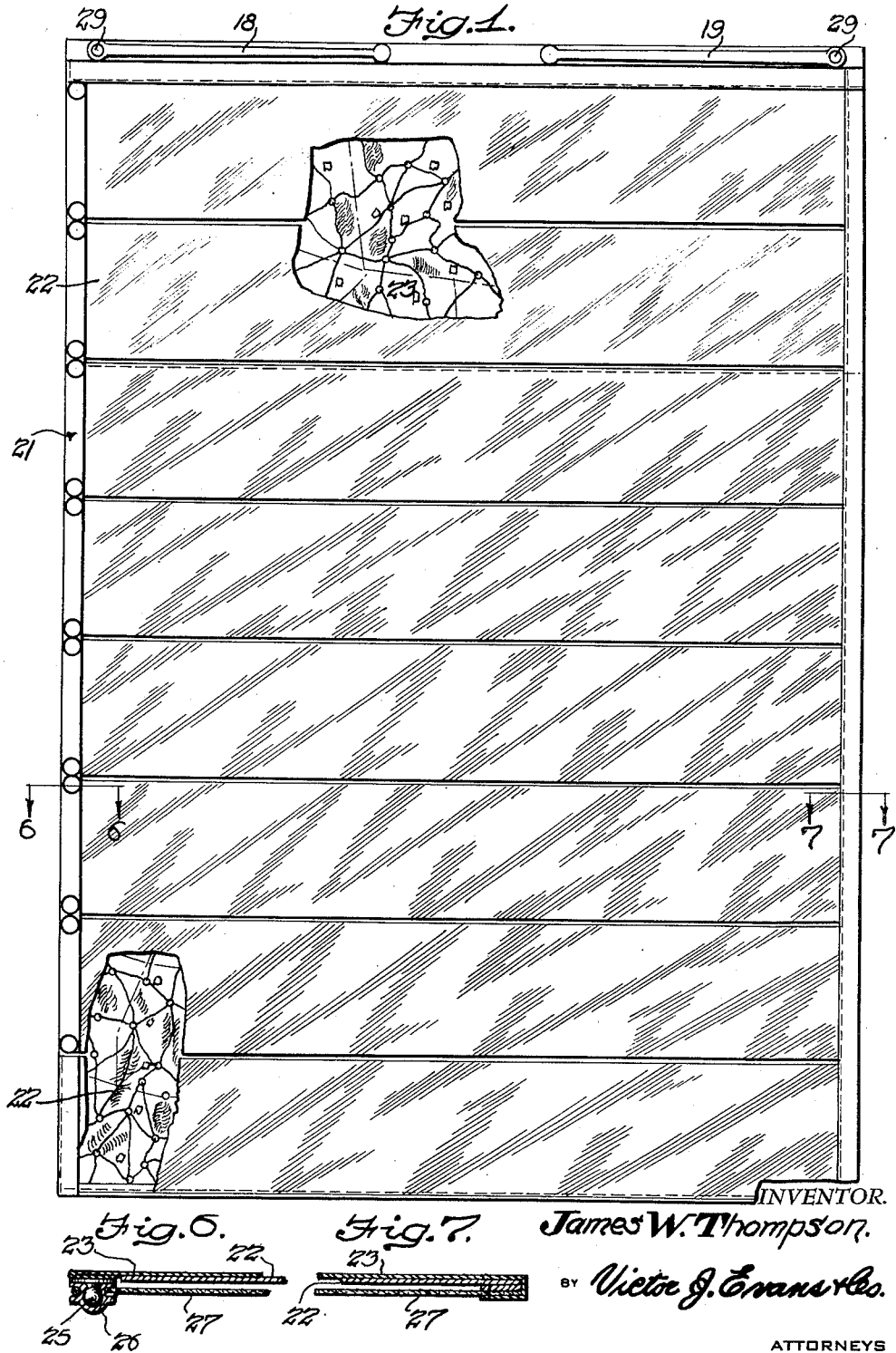

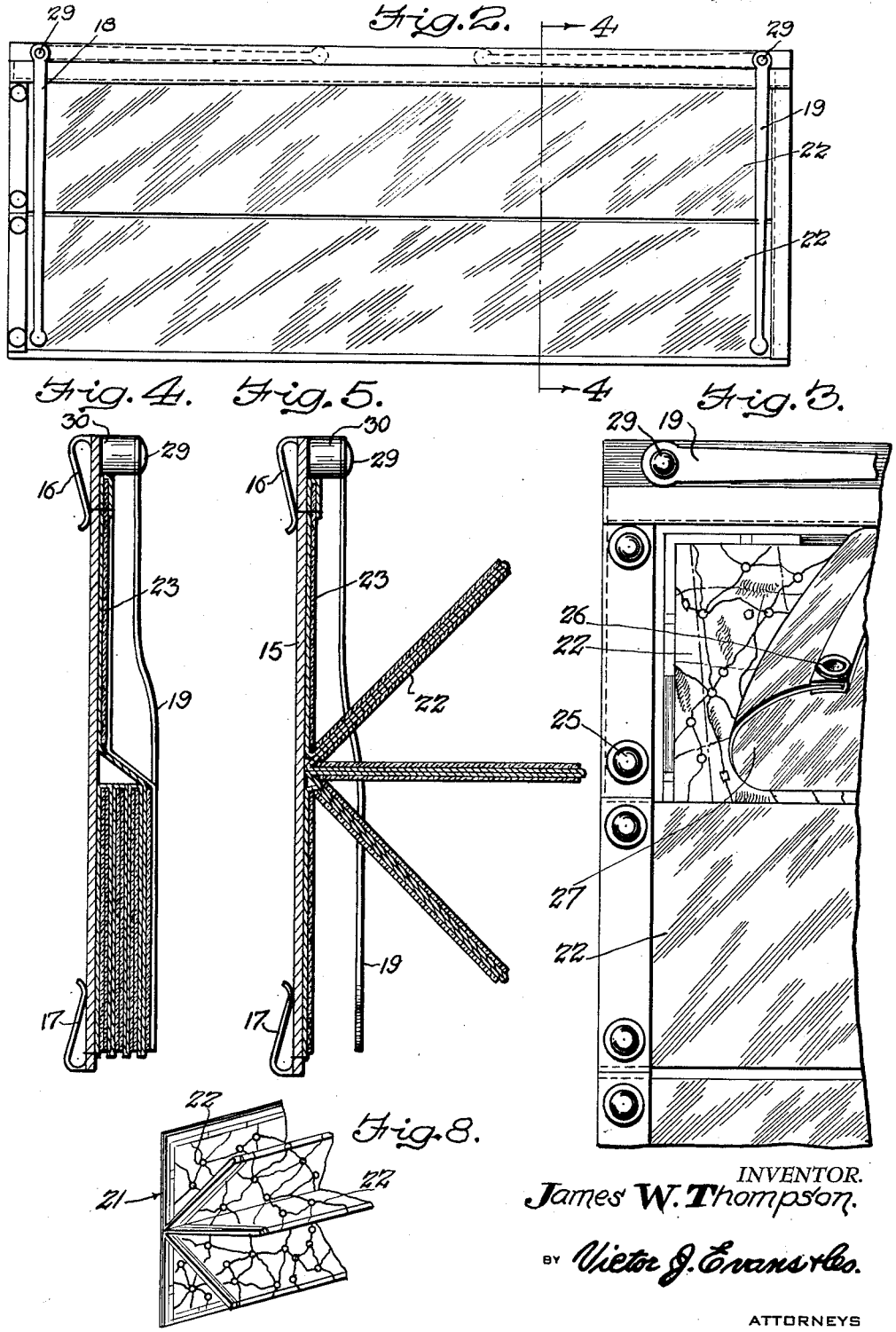

Patented Jan. 23, 1951

2,539,286

UNITED STATES PATENT OFFICE 2,539,286

ROAD MAP ASSEMBLY FOR AUTOMOBILE SUNSHADES

James West Thompson, Columbus, Miss.

Application November 17, 1947, Serial No. 786,345

2 Claims. (Cl. 40—102)

This invention relates to a road map device for use in automobiles.

It is an object of the present invention to provide a road map adapted to be attached to the automobile sunshade and wherein parts of the map are folded onto the face of a plate which is fitted onto the shade and wherein there are arms adapted to be swung down to retain the map sections in the positions which they are folded.

Other objects of the present invention are to provide a road map adapted for assembly upon a sunshade, which is of simple construction, easy to manipulate, inexpensive to manufacture and convenient to use.

For a better understanding of the invention, reference may be had to the following detailed description taken in connection with the accompanying drawing, in which Fig. 1 is a plan view of the map sections after they have been extended from the map base, Fig. 2 is a front elevational view of the road map when the map sections have been folded onto the map base, Fig. 3 is an enlarged fragmentary portion of the road map, Figs. 4 and 5 are sectional views taken generally on line 4—4 of Fig. 2, Figs. 6 and 7 are respectively sectional views on lines 6—6 and 7—7 of Fig. 1, Fig. 8 is an illustrative perspective view showing how the sections are opened up.

Referring now to the figures, 15 represents a base plate on the rear of which are top and bottom clips 16 and 17 adapted to be secured over the top and bottom edges of a sunshade of an automobile. At the top edge and at opposite ends thereof are located respectively retaining arms 18 and 19 adapted to be pivoted from the raised position as shown in Fig. 2 in dotted lines to the lowered position as shown in full lines in Fig. 2. A map 21 is formed of map sections 22 secured to a flexible backing 23 which has snap fastener elements 25 for receiving corresponding snap fastener elements 26 of covering pieces 27. The backing 23 and the map 21 are disposed over the base 15. The various sections 22 can be folded as shown in either Fig. 4 or 5, and will be retained when folded flat by the pivot arms 18 and 19.

It will be apparent that the map device can be easily mounted on the sunshade and that by turning the various sections to the desired locations the sections will be retained in full view so that they can be read at a glance by the operator in looking up toward the sunshade. The covering piece 27 is transparent and there is one piece for each map section. The map is observed through the covering piece. The arms 18 and 19 are secured to the top edge of the base 15 by the fastening pins 29 which extend through spacing members 30 to hold the arms outwardly of the front of the base.

While various changes may be made in the detail construction, it shall be understood that such changes shall be within the spirit and scope of the present invention as defined by the appended claims.

I claim:

1. A road map device comprising a base, means extending from the base for the attachment of the same to a sunshade of an automobile, a map disposed upon the base and comprising sections which can be folded over onto the base, and pivot arms extending from the top of the base downwardly and over the map sections to retain the same in their adjusted positions, said map device comprising a flexible sheet with the map sections attached thereto, said arms being pivotally connected to the upper edge of the base and adapted to swing downwardly therefrom and over the ends of the sections and snap fastening elements disposed at the sides of the maps and covering having corresponding snap fasteners at their opposite ends adapted to be secured to the respective snap fasteners at the sides of the map.

2. A road map device comprising a base, means extending from the base for the attachment of the same to a sunshade of an automobile, a map disposed upon the base and comprising sections which can be folded over onto the base, and pivot arms extending from the top of the base downwardly and over the map sections to retain the same in their adjusted positions, and snap fastening elements disposed at the sides of the maps, and covering having corresponding snap fasteners at their opposite ends adapted to be secured to the respective snap fasteners at the sides of the map.

JAMES WEST THOMPSON.

REFERENCES CITED

The following references are of record in the file of this patent:

UNITED STATES PATENTS

| Number | Name | Date |
|---|---|---|
| 1,201,700 | Cohen | Oct. 17, 1916 |
| 1,697,350 | Eubank | Jan. 1, 1929 |
| 1,894,233 | Ellis | Jan. 10, 1933 |
| 2,211,879 | Cave | Aug. 20, 1940 |
| 2,377,225 | Gisleson | May 29, 1945 |

FOREIGN PATENTS

| Number | Country | Date |
|---|---|---|
| 249,295 | Italy | July 12, 1926 |